US012792476B2

(12) United States Patent
Li et al.

(10) Patent No.: US 12,792,476 B2
(45) Date of Patent: Nov. 10, 2026

(54) GPT BACKUP AND RECOVERY METHOD, AND RELATED DEVICE

(71) Applicant: Amlogic (Xi'an) Co., Ltd., Xi'an City (CN)

(72) Inventors: Ruixuan Li, Xi'an City (CN); Yonghui Yu, Xi'an City (CN)

(73) Assignee: Amlogic (Xi'an) Co., Ltd., Xi'an City (CN)

( * ) Notice: Subject to any disclaimer, the term of this patent is extended or adjusted under 35 U.S.C. 154(b) by 0 days.

(21) Appl. No.: 19/218,079

(22) Filed: May 23, 2025

(65) Prior Publication Data

US 2025/0370885 A1 Dec. 4, 2025

(30) Foreign Application Priority Data

May 29, 2024 (CN) ......................... 202410686169.0

(51) Int. Cl.
*G06F 11/14* (2026.01)
*G06F 11/1446* (2026.01)

(52) U.S. Cl.
CPC ...... *G06F 11/1469* (2013.01); *G06F 2201/84* (2013.01)

(58) Field of Classification Search
CPC ............. G06F 11/1469; G06F 2201/84; G06F 3/0644; G06F 11/1458; G06F 11/1435; G06F 11/1456; G06F 11/1451
USPC ........................................................ 707/654
See application file for complete search history.

(56) References Cited

U.S. PATENT DOCUMENTS

| | | | | |
|---|---|---|---|---|
| 8,006,125 | B1 * | 8/2011 | Meng | G06F 11/1417 714/6.2 |
| 8,095,753 | B1 * | 1/2012 | Pandey | G06F 3/0689 711/112 |
| 12,222,911 | B1 * | 2/2025 | Singh | G06N 3/0455 |
| 2004/0255106 | A1 * | 12/2004 | Rothman | G06F 11/1417 713/1 |
| 2012/0272095 | A1 * | 10/2012 | Liu | G06F 8/654 714/6.1 |
| 2021/0026965 | A1 * | 1/2021 | Suryanarayana | G06F 11/1464 |
| 2021/0055877 | A1 * | 2/2021 | Akamatsu | G06F 3/061 |

(Continued)

FOREIGN PATENT DOCUMENTS

| | | | | |
|---|---|---|---|---|
| CN | 103189840 A | * | 7/2013 | G06F 11/1435 |
| CN | 114443353 A | * | 5/2022 | G06F 11/1448 |

(Continued)

OTHER PUBLICATIONS

Extended European Search Report issued in European Patent Application No. 25179061.4, dated Nov. 18, 2025, in 10 pages.

*Primary Examiner* — Hicham Skhoun
(74) *Attorney, Agent, or Firm* — Knobbe, Martens, Olson & Bear, LLP

(57) ABSTRACT

A globally unique identifier partition table (GPT) backup and recovery method and a related device are provided. The GPT backup method includes: specifying, in a storage medium, a backup partition for storing a backup GPT, where the backup partition is located outside a user partition in the storage medium; and writing the backup GPT to the backup partition during writing of a GPT to the storage medium. Through the technical solutions of the present invention, integrity of data of the user partition can be ensured when a non-GPT system is upgraded to a GPT system.

16 Claims, 3 Drawing Sheets

(56) References Cited

U.S. PATENT DOCUMENTS

| | | | | |
|---|---|---|---|---|
| 2022/0308789 | A1* | 9/2022 | Nagahara | G06F 3/0679 |
| 2023/0063956 | A1* | 3/2023 | Yamashita | G06F 11/0727 |
| 2023/0069169 | A1* | 3/2023 | Fujii | H04N 1/00938 |

FOREIGN PATENT DOCUMENTS

| | | | | | |
|---|---|---|---|---|---|
| CN | 114816542 | A | * | 7/2022 | G06F 9/4451 |
| CN | 114816847 | A | * | 7/2022 | G06F 3/0644 |
| EP | 1329800 | A1 | | 7/2003 | |
| JP | 2015005009 | A | * | 1/2015 | |
| KR | 20140039611 | A | * | 4/2014 | G06F 9/24 |
| RU | 2830489 | C1 | * | 11/2024 | |

* cited by examiner

GPT BACKUP AND RECOVERY METHOD, AND RELATED DEVICE

CROSS-REFERENCE TO RELATED APPLICATIONS

This application claims priority to Chinese Patent Application No. 202410686169.0, filed on May 29, 2024, which is incorporated by reference in its entirety.

TECHNICAL FIELD

Embodiments of the present invention relate to the field of system partitions, and in particular, to a GPT backup and recovery method and a related device.

BACKGROUND

Software tools that run independently of an operating system are present on an electronic device such as a personal computer (PC), for example, a backup recovery tool, a driver installation tool, and a network cloning tool. Generally, such software tools run based on a customized Linux operating system.

Conventionally, a storage medium partition is based on a partition scheme using a master boot record (MBR). With the release of the extensible firmware interface (EFI) specification and the unified EFI (UEFI) specification, a platform architecture based on an EFI or a UEFI gradually replaces an architecture based on a conventional basic input output system (BIOS) model to serve as a choice architecture for designing, constructing, and operating a data processing system. A storage medium partition architecture, namely a globally unique identifier partition table format (GUID partition table format/GPT) used by the EFI, also gradually becomes a mainstream storage medium partition scheme.

SUMMARY

A problem resolved by embodiments of the present invention is to provide a globally unique identifier partition table (GPT) backup and recovery method and a related device, so that integrity of data of a user partition can be ensured when a non-GPT system is upgraded to a GPT system.

In order to resolve the foregoing problem, an embodiment of the present invention provides a GPT backup method, including:

- specifying, in a storage medium, a backup partition for storing a backup GPT, where the backup partition is located outside a user partition in the storage medium; and
- writing the backup GPT to the backup partition during writing of a GPT to the storage medium.

Optionally, the backup partition is located in a reserved space between user partitions of the storage medium or in a system partition.

Optionally, the specifying, in a storage medium, a backup partition for storing a backup GPT includes: defining a variable pointing to an address of the backup partition in a GPT-head structure.

Optionally, after the specifying, in a storage medium, a backup partition for storing a backup GPT, the GPT backup method further includes: specifying, in the storage medium, an address space for storing a variable pointing to an address of the backup partition; and

- after the writing the backup GPT to the backup partition, the GPT backup method further includes: writing, to the address space, the variable pointing to the address of the backup partition.

Optionally, after the writing, to the address space, the variable pointing to the address of the backup partition, the GPT backup method further includes: adding a check variable to a tail of the variable pointing to the address of the backup partition, where the check variable is configured for verifying integrity of the variable pointing to the address of the backup partition.

Optionally, before the adding a check variable to a tail of the variable pointing to the address of the backup partition, the GPT backup method further includes: adding a magic variable to a head of the variable pointing to the address of the backup partition, where the magic variable is configured for causing a value of the check variable to be not zero.

Correspondingly, an embodiment of the present invention further provides a GPT backup component, including:

- a specifying component, adapted to specify, in a storage medium, a backup partition for storing a backup GPT, where the backup partition is located outside a user partition in the storage medium, and
- a backup component, adapted to write the backup GPT to the backup partition during writing of the GPT to the storage medium.

Correspondingly, an embodiment of the present invention further provides a GPT recovery method, including:

- checking, during registering of a GPT, whether the GPT and a backup GPT located in a backup partition are complete, where the backup partition is located outside a user partition in a storage medium; and
- recovering the GPT through the backup GPT located in the backup partition if the GPT is damaged and the backup GPT located in the backup partition is complete.

Optionally, the backup partition is located in a reserved space between user partitions of the storage medium or in a system partition.

Optionally, a variable pointing to an address of the backup partition is stored in an address space in the storage medium; and

- the checking whether a backup GPT is complete includes: obtaining, from the address space, the variable pointing to the address of the backup partition; checking whether the variable pointing to the address of the backup partition is complete; obtaining address information of the backup partition through the variable pointing to the address of the backup partition if the variable pointing to the address of the backup partition is complete; obtaining the backup GPT from the backup partition based on the address information of the backup partition; and checking whether the backup GPT obtained from the backup partition is complete.

Optionally, a tail of the variable pointing to the address of the backup partition further includes a check variable, the check variable being configured for verifying integrity of the variable pointing to the address of the backup partition; and

- the checking whether the variable pointing to the address of the backup partition is complete includes: calculating a corresponding check value through a preset check function based on the variable pointing to the address of the backup partition, where if the calculated check value is consistent with a value of the check variable, it indicates that the variable pointing to the address of the backup partition is complete; and if the calculated check value is inconsistent with the value of the check variable, it indicates that the variable pointing to the address of the backup partition is damaged.

Optionally, a head of the variable pointing to the address of the backup partition further includes a magic variable, the magic variable being configured for causing a value of the check variable to be not zero; and the calculating a corresponding check value through a preset check function based on the variable pointing to the address of the backup partition includes: calculating the corresponding check value through the preset check function based on the variable pointing to the address of the backup partition and the magic variable.

Optionally, the user partition in the storage medium for storing the backup GPT by default is last 34 storage blocks of the storage medium.

Optionally, if the GPT is complete and the backup GPT located in the backup partition is damaged, the GPT recovery method further includes: recovering the backup GPT located in the backup partition through the GPT.

Optionally, the recovering the backup GPT located in the backup partition through the GPT includes: obtaining, from a GPT-head structure in the GPT, a variable pointing to an address of the backup partition; obtaining the address of the backup partition based on the variable pointing to the address of the backup partition; and rewriting the backup GPT to the backup partition.

Optionally, if the GPT and the backup GPT located in the backup partition are both damaged, the GPT recovery method further includes: attempting to obtain the backup GPT from the user partition in the storage medium for storing the backup GPT by default; and recovering, when the backup GPT is successfully obtained from the user partition in the storage medium for storing the backup GPT by default, the GPT and the backup GPT located in the backup partition through the backup GPT obtained from the user partition in the storage medium for storing the backup GPT by default.

Optionally, the user partition in the storage medium for storing the backup GPT by default is last 34 storage blocks of the storage medium.

Correspondingly, an embodiment of the present invention further provides a GPT recovery component, including:

a check component, adapted to check, during registering of a GPT, whether the GPT and a backup GPT located in a backup partition are complete, where the backup partition is located outside a user partition in a storage medium; and a recovery component, adapted to recover the GPT through the backup GPT located in the backup partition if the GPT is damaged and the backup GPT located in the backup partition is complete.

Correspondingly, an embodiment of the present invention further provides a computer program product, including a computer program/instruction, the computer program/instruction, when executed by a processor, being configured for implementing the GPT backup method according to any of the above or the GPT recovery method according to any of the above.

Correspondingly, an embodiment of the present invention further provides a device, including at least one memory and at least one processor, where the memory stores one or more computer instructions, and the one or more computer instructions are executed by the processor to implement the GPT backup method according to any of the above or the GPT recovery method according to any of the above.

Correspondingly, an embodiment of the present invention further provides a storage medium, the storage medium storing one or more computer instructions, the one or more computer instructions being configured for implementing the GPT backup method according to any of the above or the GPT recovery method according to any of the above.

Compared with the prior art, the technical solutions of the embodiments of the present invention have the following advantages.

The GPT backup method provided in the embodiments of the present invention includes: specifying, in a storage medium, a backup partition for storing a backup GPT, where the backup partition is located outside a user partition in the storage medium; and writing the backup GPT to the backup partition during writing of a GPT to the storage medium.

In the GPT backup method provided in the embodiments of the present invention, a backup GPT is stored outside a user partition of the storage medium, so that the backup GPT can be prevented from overwriting part of data in the user partition when a non-GPT system is upgraded to a GPT system, thereby maintaining integrity of user data and meeting a requirement of upgrading the non-GPT system to the GPT system.

DETAILED DESCRIPTION

It may be learned from the background art that a current globally unique identifier partition table (GPT) backup mechanism may cause loss of user data, and cannot meet a requirement of upgrading a non-GPT system to a GPT system.

In order to resolve the foregoing problem, a GPT backup method provided in the embodiments of the present invention includes: specifying, in a storage medium, a backup partition for storing a backup GPT, where the backup partition is located outside a user partition in the storage medium; and writing the backup GPT to the backup partition during writing of a GPT to the storage medium.

In the GPT backup method provided in the embodiments of the present invention, a backup GPT is stored outside a user partition of the storage medium, so that the backup GPT can be prevented from overwriting part of data in the user partition when a non-GPT system is upgraded to a GPT system, thereby maintaining integrity of user data and meeting a requirement of upgrading the non-GPT system to the GPT system.

In order to make the foregoing objectives, features, and advantages of the present invention more apparent and easier to understand, specific embodiments of the present invention are described in detail below with reference to the accompanying drawings.

Figure 1:
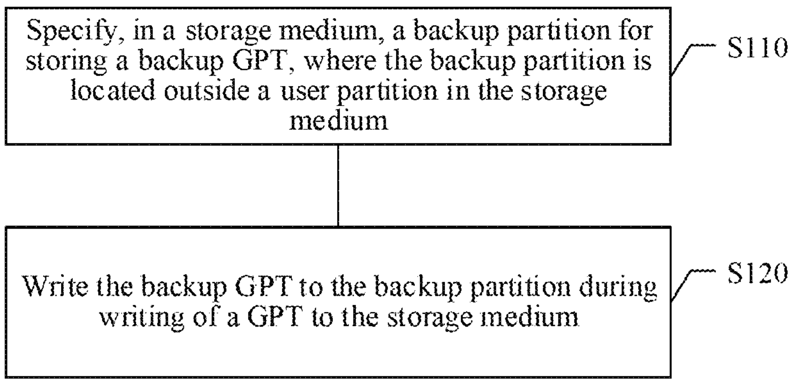
FIG. 1 is a schematic flowchart of an embodiment of a globally unique identifier partition table (GPT) backup method according to a technical solution of the present invention.

FIG. 1 is a schematic flowchart of an embodiment of a GPT backup method according to a technical solution of the present invention. Referring to FIG. 1, a GPT backup method may specifically include the following steps.

Step S110: Specify, in a storage medium, a backup partition for storing a backup GPT, where the backup partition is located outside a user partition in the storage medium.

Step S120: Write the backup GPT to the backup partition during writing of a GPT to the storage medium.

Still referring to FIG. 1, step S110 of specifying, in the storage medium, the backup partition for storing the backup GPT is performed, where the backup partition is located outside the user partition in the storage medium.

The backup partition for storing the backup GPT that is specified in the storage medium provides a foundation for writing the backup GPT to the backup partition during subsequent writing of the GPT to the storage medium.

According to the existing GPT protocol, the backup GPT is stored in last 34 storage blocks of a last user partition of the storage medium by default. Correspondingly, when a non-GPT system is upgraded to a GPT system, the existing GPT backup mechanism may reduce capacity of the last user partition of the storage medium by 34 storage blocks, which are configured to store the backup GPT. In this case, in the non-GPT system, user data stored in 34 storage blocks of the last user partition is to be overwritten by the backup GPT, resulting in loss of user data.

In this embodiment, a backup partition for storing the backup GPT is specified in the storage medium, and the backup partition is located outside the user partition in the storage medium, so that the backup GPT can be prevented from overwriting part of data in the user partition when a non-GPT system is upgraded to a GPT system, thereby maintaining integrity of user data and meeting a requirement of upgrading the non-GPT system to the GPT system.

In this embodiment, the backup partition in the storage medium for storing the backup GPT is located in a reserved space between user partitions in the storage medium.

In another embodiment, the backup partition can be further located in another non-user partition in the storage medium. In an example, when no reserved space is provided between the user partitions in the storage medium, the backup partition is located in a free space in a system partition in the storage medium.

In this embodiment, the step of specifying, in the storage medium, the backup partition for storing the backup GPT includes: defining a variable pointing to an address of the backup partition in a GPT-head structure.

Specifically, the variable pointing to the address of the backup partition is a variable alternate_lba in the GPT-head structure, where the GPT-head structure is a first storage block structure defined by the GPT protocol.

The variable alternate_lba in the GPT-head structure is adopted as the variable pointing to the address of the backup partition. In other words, the variable alternate_lba in the GPT-head structure in the existing GPT protocol is changed, which points to the user partition in the storage medium for storing the backup GPT by default, to point to the backup partition located outside the user partition in the storage medium. A minor modification to the GPT protocol helps improve compatibility with the existing GPT protocol.

Still referring to FIG. 1, step S120 of writing the backup GPT to the backup partition during writing of the GPT to the storage medium is performed.

During writing of the GPT to the storage medium, the backup GPT is written to the backup partition, so that a damaged GPT can be recovered subsequently through the backup GPT located in the backup partition.

In this embodiment, the variable pointing to the address of the backup partition is located in the GPT-head structure, and the variable pointing to the address of the backup partition is stored in the address space in the storage medium. Correspondingly, the step of writing the backup GPT to the backup partition includes: reading, from a GPT-head structure, a variable pointing to an address of the backup partition; obtaining address information of the backup partition based on the variable pointing to the address of the backup partition; and writing the backup GPT to the address space based on the address information of the backup partition.

In this embodiment, the GPT is located in first 35 (0-34) storage blocks of the storage medium. Correspondingly, writing the GPT to the storage medium means writing the GPT to the first 35 storage blocks located in the storage medium.

In this embodiment, after the specifying, in a storage medium, a backup partition for storing a backup GPT, the GPT backup method further includes: specifying, in the storage medium, an address space for storing a variable pointing to an address of the backup partition. Correspondingly, after the writing the backup GPT to the backup partition, the GPT backup method further includes: writing, to the address space, the variable pointing to the address of the backup partition.

The variable pointing to the address of the backup partition is written to the address space, so as to obtain a position of the backup partition when the damaged GPT is recovered subsequently through the backup GPT in the backup partition, thereby obtaining the backup GPT stored in the backup partition.

In this embodiment, after the writing, to the address space, the variable pointing to the address of the backup partition, the GPT backup method further includes: adding a check variable to a tail of the variable pointing to the address of the backup partition, where the check variable is configured for verifying integrity of the variable pointing to the address of the backup partition.

The check variable is added to the tail of the variable pointing to the address of the backup partition, so that integrity of the address of the backup partition can be verified subsequently based on the variable pointing to the address of the backup partition and the check variable.

In this embodiment, before the adding a check variable to a tail of the variable pointing to the address of the backup partition, the method further includes: adding a magic variable to a head of the variable pointing to the address of the backup partition, where the magic variable is configured for causing a value of the check variable to be not zero.

In a case that the magic variable is not present and the address of the backup partition is zero, after the variable is assigned to the address of the backup partition, a value of the check variable calculated through a preset check function is also zero based on the variable pointing to the address of the backup partition. If the address of the backup partition is not assigned the variable or an erasing operation is performed on a value of the variable, the value of the variable also remains zero, and the value of the check variable calculated through the preset check function is also zero based on the variable pointing to the address of the backup partition. In other words, in a case that the value of the check variable calculated through the preset check function is zero, it cannot be determined whether the address of the backup partition is zero, or the address of the backup partition is not assigned the variable, or the erasing operation is performed on the variable. Therefore, the integrity of the variable pointing to the address of the backup partition cannot be verified.

The magic variable is a non-zero string. If a magic variable is present, even though the address of the backup partition is zero, the value of the check variable calculated through the preset check function is not zero based on the magic variable and the address of the backup partition. Therefore, the presence of the magic variable can ensure the integrity of the variable of the address of the backup partition.

Correspondingly, an embodiment of the present invention further provides a GPT backup component.

Figure 2:
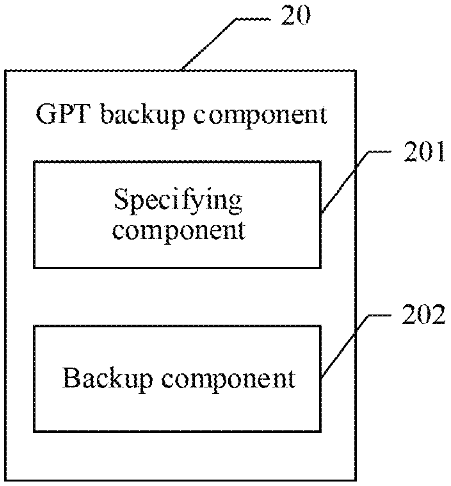
FIG. 2 is a schematic structural diagram of an embodiment of a GPT backup component according to a technical solution of the present invention.

FIG. 2 is a schematic structural diagram of an embodiment of a GPT backup component according to a technical solution of the present invention. Referring to FIG. 2, a GPT backup component 20 may include: a specifying component 201, adapted to specify, in a storage medium, a backup partition for storing a backup GPT, where the backup partition is located outside a user partition in the storage medium; and a backup component 202, adapted to write the backup GPT to the backup partition during writing of the GPT to the storage medium.

The GPT backup component in the embodiments of the present invention may be configured to perform the foregoing GPT backup method, or another functional component may be adopted to perform the foregoing GPT backup method. For the GPT backup method, reference is made to the detailed description of the foregoing section, and details are not described herein again.

Correspondingly, an embodiment of the present invention further provides a GPT recovery method.

Figure 3:
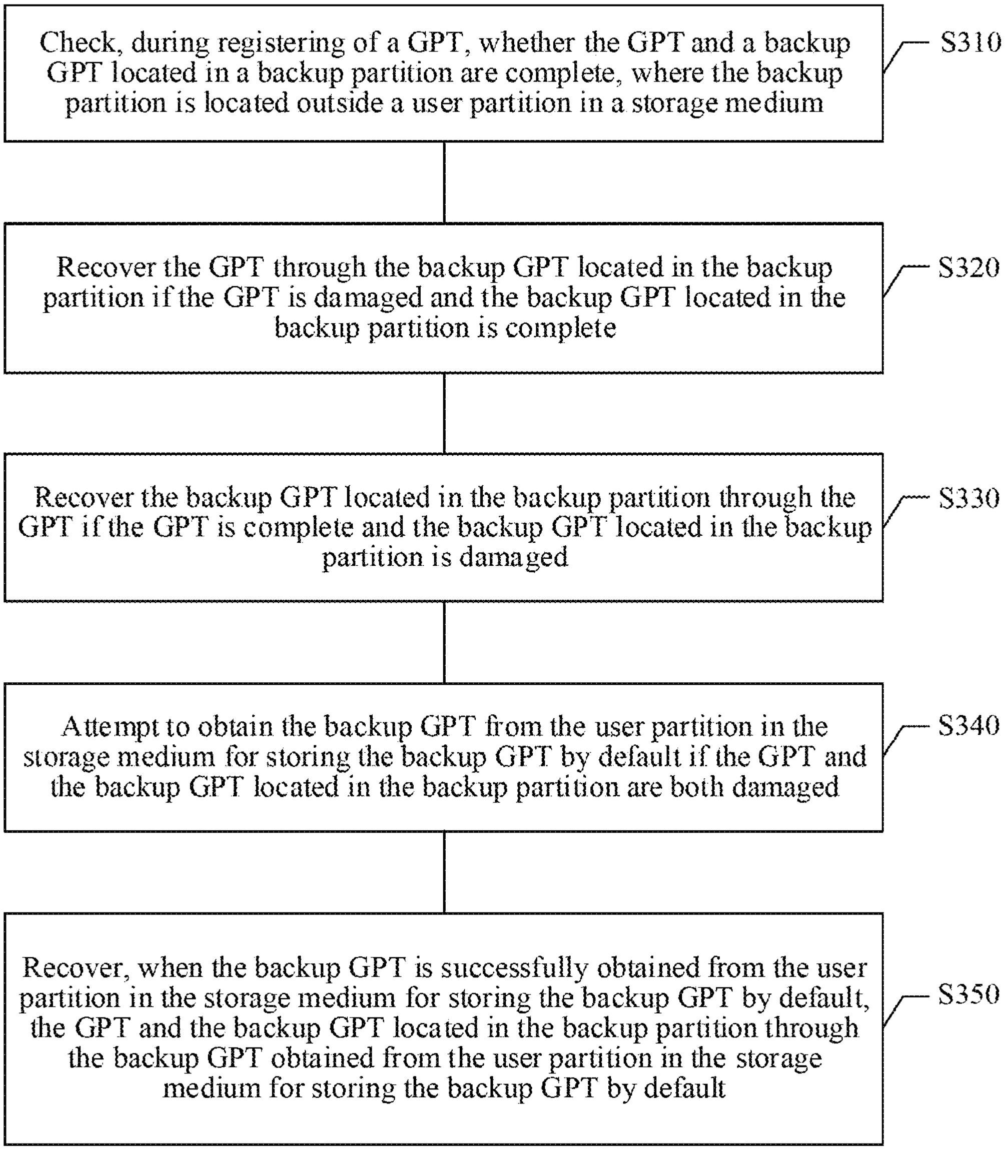
FIG. 3 is a schematic flowchart of an embodiment of a GPT recovery method according to a technical solution of the present invention.

FIG. 3 is a schematic flowchart of an embodiment of a GPT recovery method according to a technical solution of the present invention. Referring to FIG. 3, the GPT recovery method includes the following steps.

Step S310: Check, during registering of a GPT, whether the GPT and a backup GPT located in a backup partition are complete, where the backup partition is located outside a user partition in a storage medium.

Step S320: Recover the GPT through the backup GPT located in the backup partition if the GPT is damaged and the backup GPT located in the backup partition is complete.

Still referring to FIG. 3, step S310 of checking, during registering of the GPT, whether the GPT and the backup GPT located in the backup partition are complete is performed, where the backup partition is located outside the user partition in a storage medium.

During registering of the GPT, it is checked whether the GPT and the backup GPT located in the backup partition are complete, so as to provide a foundation for subsequently recovering the GPT through the backup GPT located in the backup partition when the GPT is damaged and the backup GPT located in the backup partition is complete.

In this embodiment, the GPT is located in first 35 storage blocks of the storage medium. Correspondingly, the step of checking whether the GPT is complete includes: obtaining a GPT from the first 35 storage blocks of the storage medium; and checking whether the GPT obtained from the first 35 storage blocks of the storage medium is complete.

In this embodiment, a header of the GPT has cyclic redundancy check (CRC) information. Correspondingly, the GPT is checked through the CRC information obtained from the header of the obtained GPT, and it is determined that the GPT is complete when the GPT passes the CRC check. On the contrary, it indicates that the GPT is damaged.

In this embodiment, the backup partition in the storage medium for storing the backup GPT is located in a reserved space between user partitions in the storage medium.

In another embodiment, the backup partition is located in a non-user partition in the storage medium. In an example, when no reserved space is provided between the user partitions in the storage medium, the backup partition is set in a free space in a system partition in the storage medium.

In this embodiment, a variable pointing to an address of the backup partition is stored in an address space in the storage medium, and an address of the address space is pointed to by the variable. Correspondingly, the step of checking whether the backup GPT is complete includes: obtaining the variable pointing to the address of the backup partition; checking whether the variable pointing to the address of the backup partition is complete; obtaining address information of the backup partition through the variable pointing to the address of the backup partition if the variable pointing to the address of the backup partition is complete; obtaining the backup GPT from the backup partition based on the address information of the backup partition; and checking whether the backup GPT obtained from the backup partition is complete.

In this embodiment, the variable pointing to the address of the backup partition is located in a GPT-head structure. Correspondingly, the step of obtaining the variable pointing to the address of the backup partition includes: obtaining the variable pointing to the address of the backup partition from the GPT-head structure. The variable pointing to the address of the backup partition is a variable alternate_lba in the GPT-head structure.

In this embodiment, a tail of the variable pointing to the address of the backup partition further includes a check variable for verifying integrity of the variable pointing to the address of the backup partition. The check variable can ensure integrity of the address of the backup partition to which the variable points, thereby ensuring that the backup GPT is accurately obtained from the backup partition.

Specifically, the step of checking whether the variable pointing to the address of the backup partition is complete includes: calculating a corresponding check value through a preset check function based on the variable pointing to the address of the backup partition, where if the calculated check value is consistent with a value of the check variable, it indicates that the variable pointing to the address of the backup partition is complete; and if the calculated check value is inconsistent with the value of the check variable, it indicates that the variable pointing to the address of the backup partition is damaged.

In this embodiment, a head of the variable pointing to the address of the backup partition further includes a magic variable for ensuring that a value of the check variable is not zero. The magic variable can ensure that an operation of assigning the variable to the address of the backup partition has been performed before, and can further ensure the integrity of the variable pointing to the address of the backup partition.

In a case that the magic variable is not present and the address of the backup partition is zero, after the variable is assigned to the address of the backup partition, a value of the check variable calculated through a preset check function is also zero based on the variable pointing to the address of the backup partition. If the address of the backup partition is not assigned the variable or an erasing operation is performed on a value of the variable, the value of the variable also remains zero, and the value of the check variable calculated through the preset check function is also zero based on the variable pointing to the address of the backup partition. In other words, in a case that the value of the check variable calculated through the preset check function is zero, it cannot be determined whether the address of the backup partition is zero, or the address of the backup partition is not assigned the variable, or the erasing operation is performed on the variable. Therefore, the integrity of the variable pointing to the address of the backup partition cannot be verified.

The magic variable is a non-zero string. If a magic variable is present, even though the address of the backup partition is zero, the value of the check variable calculated through the preset check function is not zero based on the magic variable and the address of the backup partition. Therefore, the presence of the magic variable can ensure the integrity of the variable of the address of the backup partition.

Correspondingly, the step of checking whether the variable pointing to the address of the backup partition is complete includes: calculating the corresponding check value through the preset check function based on the variable pointing to the address of the backup partition and the magic variable, where if the calculated check value is consistent with a value of the check variable, it indicates that the variable pointing to the address of the backup partition is complete; and if the calculated check value is inconsistent with the value of the check variable, it indicates that the variable pointing to the address of the backup partition is damaged.

Still referring to FIG. 3, step S320 of recovering the GPT through the backup GPT located in the backup partition if the GPT is damaged and the backup GPT located in the backup partition is complete is performed.

The GPT through the backup GPT located in the backup partition is recovered if the GPT is damaged and the backup GPT located in the backup partition is complete, which enables an operating system to manage data in the storage medium through the recovered GPT.

Still referring to FIG. 3, if the GPT is complete and the backup GPT located in the backup partition is damaged, the GPT recovery method further includes:

performing step S330 of recovering the backup GPT located in the backup partition through the GPT.

If the GPT is complete and the backup GPT located in the backup partition is damaged, the backup GPT located in the backup partition is recovered through the GPT, to meet a backup requirement of the GPT, so that the damaged GPT can be recovered subsequently through the backup GPT located in the backup partition.

In this embodiment, the variable pointing to the address of the backup partition is located in the GPT-head structure, and the variable pointing to the address of the backup partition is stored in the address space in the storage medium. Correspondingly, the step of recovering the backup GPT located in the backup partition through the GPT includes: obtaining, from a GPT-head structure in the GPT, a variable pointing to an address of the backup partition; obtaining the address of the backup partition based on the variable pointing to the address of the backup partition; and rewriting the backup GPT to the backup partition based on the address of the backup partition.

Still referring to FIG. 3, if the GPT and the backup GPT located in the backup partition are both damaged, the GPT recovery method further includes:

performing step S340 of attempting to obtain the backup GPT from the user partition in the storage medium for storing the backup GPT by default.

If the GPT and the backup GPT located in the backup partition are both damaged, an attempt is made to obtain the backup GPT from the user partition in the storage medium for storing the backup GPT by default, so as to provide a foundation for subsequently recovering, when the backup GPT is successfully obtained from the user partition in the storage medium for storing the backup GPT by default, the GPT and the backup GPT located in the backup partition through the backup GPT obtained from the user partition in the storage medium for storing the backup GPT by default.

If the GPT and the backup GPT located in the backup partition are both damaged, an attempt is made to obtain the backup GPT from the user partition in the storage medium for storing the backup GPT by default, which can increase a success rate of an operation of recovering the GPT and the backup GPT located in the backup partition.

In this embodiment, the user partition in the storage medium for storing the backup GPT by default is last 34 storage blocks of the storage medium. Correspondingly, the step of attempting to obtain the backup GPT from the user partition in the storage medium for storing the backup GPT by default includes: attempting to obtain the backup GPT from the last 34 storage blocks of the storage medium.

Step S350 of recovering, when the backup GPT is successfully obtained from the user partition in the storage medium for storing the backup GPT by default, the GPT and the backup GPT located in the backup partition through the backup GPT obtained from the user partition in the storage medium for storing the backup GPT by default is performed.

When the backup GPT is successfully obtained from the user partition in the storage medium for storing the backup GPT by default, the GPT and the backup GPT located in the backup partition are recovered through the backup GPT obtained from the user partition in the storage medium for storing the backup GPT by default, so that a damaged one of the GPT and the backup GPT located in the backup partition can be subsequently recovered through an undamaged one thereof, thereby enabling the GPT system to be more robust.

Correspondingly, an embodiment of the present invention further provides a GPT recovery component.

Figure 4:
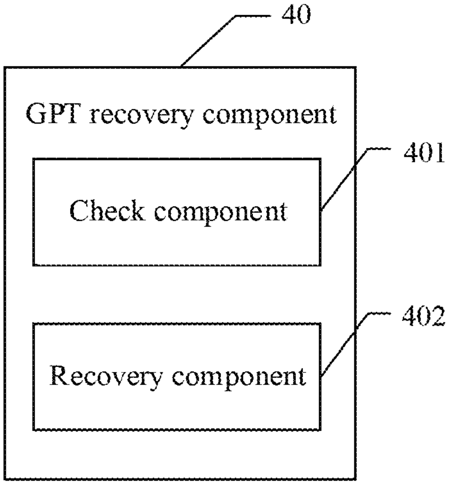
FIG. 4 is a schematic structural diagram of an embodiment of a GPT recovery component according to a technical solution of the present invention.

FIG. 4 is a schematic structural diagram of an embodiment of a GPT recovery component according to a technical solution of the present invention. Referring to FIG. 4, a GPT recovery component 40 may include: a check component 401, adapted to check, during registering of a GPT, whether the GPT and a backup GPT located in a backup partition are complete, where the backup partition is located outside a user partition in a storage medium; and a recovery component 402, adapted to recover the GPT through the backup GPT located in the backup partition if the GPT is damaged and the backup GPT located in the backup partition is complete.

The GPT recovery component in the embodiments of the present invention may be configured to perform the foregoing GPT recovery method, or another functional component may be adopted to perform the foregoing GPT recovery method. For the GPT recovery method, reference is made to the detailed description of the foregoing section, and details are not described herein again.

Correspondingly, an embodiment of the present invention further provides a device. The device may implement the GPT backup method or the GPT recovery method provided in the embodiments of the present invention through the foregoing GPT backup method or the GPT recovery method in the form of loading a program.

Figure 5:
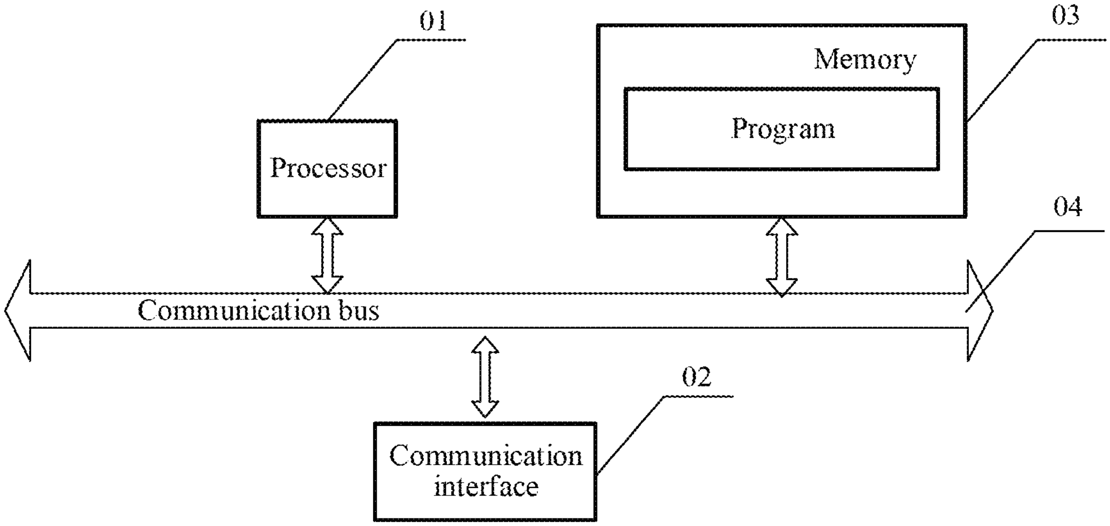
FIG. 5 is a schematic diagram of an optional hardware structure of a device according to a technical solution of the present invention.

Referring to FIG. 5, a schematic diagram of an optional hardware structure of a device according to an embodiment of the present invention is shown. The device in this embodiment of the present invention includes at least one processor 01, at least one communication interface 02, at least one memory 03, and at least one communication bus 04.

In this embodiment, at least one processor 01, at least one communication interface 02, at least one memory 03, and at least one communication bus 04 are provided. The processor 01, the communication interface 02, and the memory 03 communicate with each other through the communication bus 04.

The communication interface 02 may be an interface of a communication component for performing network communication, for example, an interface of a GSM component.

The processor 01 may be a central processing unit (CPU), or an application specific integrated circuit (ASIC), or one or more integrated circuits configured to implement the GPT backup method or the GPT recovery method in the embodiments.

The memory 03 may include a high-speed RAM memory, and may further include a non-volatile memory, such as at least one disk memory. The memory 03 stores one or more computer instructions, the one or more computer instructions being executed by the processor 01 to implement the GPT backup method or the GPT recovery method provided in the embodiments of the present invention.

It should be noted that the foregoing electronic device for implementation may further include other devices (not shown) that may not be necessary for the content disclosed in the embodiments of the present invention. Since the other devices may not be necessary for understanding the content disclosed in the embodiments of the present invention, the devices are not to be described one by one in the embodiments of the present invention.

Correspondingly, an embodiment of the present invention further provides a computer program product, including a computer program/instruction, the computer program/instruction, when executed by a processor, being configured for implementing the GPT backup method or the GPT recovery method provided in the embodiments of the present invention.

An embodiment of the present invention further provides a storage medium, the storage medium storing one or more computer instructions, the one or more computer instructions being configured for implementing the GPT backup method or the GPT recovery method provided in the embodiments of the present invention.

The foregoing implementations of the present invention are a combination of elements and features of the present invention. Unless otherwise mentioned, the elements or features may be considered optional. Each element or feature may be practiced without being combined with other elements or features. In addition, the implementations of the present invention may be constructed by combining some elements and/or features. An order of operations described in the implementations of the present invention may be rearranged. Some configurations of any implementation may be included in another implementation and may be replaced with corresponding configurations of another implementation. It is apparent to a person skilled in the art that claims that have no explicit reference relationship with each other in the appended claims may be combined into an implementation of the present invention, or may be included as new claims in amendments after this application is filed.

The implementations of the present invention may be implemented by various means such as hardware, firmware, software, or a combination thereof. In a hardware configuration mode, the method according to an exemplary implementation of the present invention may be implemented through one or more ASICs, a digital signal processor (DSP), a DSP device (DSPD), a programmable logic device (PLD), a field programmable gate array (FPGA), a processor, a controller, a micro-controller, a microprocessor, and the like.

In a firmware or software configuration mode, the implementations of the present invention may be implemented in the form of components, processes, functions, and the like. Software code may be stored in a memory component and executed by a processor. The memory component is located inside or outside the processor, and may send data to and receive data from the processor by various known means.

The foregoing descriptions of the disclosed embodiments enable a person skilled in the art to implement or use the present invention. Various modifications to these embodiments are apparent to a person skilled in the art, and general principles defined in this specification may be implemented in other embodiments without departing from the spirit or scope of the present invention. Therefore, the present invention is not to be limited to these embodiments described herein, but accords with the widest scope consistent with the principles and novel features disclosed herein.

Although the present invention is disclosed above, the present invention is not limited thereto. A person skilled in the art can make various changes and modifications without departing from the spirit and the scope of the present invention. Therefore, the protection scope of the present invention should be subject to the scope defined by the claims.

What is claimed is:

1. A globally unique identifier partition table (GPT) recovery method, comprising:
- checking, during registering of a GPT, whether the GPT and a backup GPT located in a backup partition are complete, wherein the backup partition is located outside a user partition in a storage medium;
- at a first time: recovering the GPT through the backup GPT located in the backup partition if the GPT is damaged and the backup GPT located in the backup partition is complete; and
- at a second time:
  - recovering the backup GPT located in the backup partition through the GPT if the GPT is complete and the backup GPT located in the backup partition is damaged,
  - wherein recovering the backup GPT comprises:
    - obtaining, from a GPT-head structure in the GPT, a variable pointing to an address of the backup partition;
    - obtaining the address of the backup partition based on the variable pointing to the address of the backup partition; and
    - rewriting the backup GPT to the backup partition based on the address of the backup partition.

2. The GPT recovery method according to claim 1, wherein the backup partition is located in a reserved space between user partitions of the storage medium or in a system partition.

3. The GPT recovery method according to claim 1, wherein a variable pointing to an address of the backup partition is stored in an address space in the storage medium; and checking whether a backup GPT is complete comprises:

obtaining, from the address space, the variable pointing to the address of the backup partition; checking whether the variable pointing to the address of the backup partition is complete;

obtaining address information of the backup partition through the variable pointing to the address of the backup partition if the variable pointing to the address of the backup partition is complete;

obtaining the backup GPT from the backup partition based on the address information of the backup partition; and checking whether the backup GPT obtained from the backup partition is complete.

4. The GPT recovery method according to claim 3, wherein a tail of the variable pointing to the address of the backup partition further comprises a check variable, the check variable being configured for verifying integrity of the variable pointing to the address of the backup partition; and checking whether the variable pointing to the address of the backup partition is complete comprises:

calculating a corresponding check value through a preset check function based on the variable pointing to the address of the backup partition, wherein if the calculated check value is consistent with a value of the check variable, it indicates that the variable pointing to the address of the backup partition is complete; and wherein if the calculated check value is inconsistent with the value of the check variable, it indicates that the variable pointing to the address of the backup partition is damaged.

5. The GPT recovery method according to claim 4, wherein a head of the variable pointing to the address of the backup partition further comprises a magic variable, the magic variable being configured for causing a value of the check variable to be not zero; and calculating a corresponding check value through a preset check function based on the variable pointing to the address of the backup partition comprises:

calculating the corresponding check value through the preset check function based on the variable pointing to the address of the backup partition and the magic variable.

6. The GPT recovery method according to claim 1, wherein the user partition in the storage medium for storing the backup GPT by default is last 34 storage blocks of the storage medium.

7. The GPT recovery method according to claim 1, further comprising, at a third time:

if the GPT and the backup GPT located in the backup partition are both damaged:

attempting to obtain the backup GPT from the user partition in the storage medium for storing the backup GPT by default; and recovering, when the backup GPT is successfully obtained from the user partition in the storage medium for storing the backup GPT by default, the GPT and the backup GPT located in the backup partition through the backup GPT obtained from the user partition in the storage medium for storing the backup GPT by default.

8. The GPT recovery method according to claim 7, wherein the user partition in the storage medium for storing the backup GPT by default is last 34 storage blocks of the storage medium.

9. A non-transitory computer readable medium storing instructions that, when executed by at least one processor, cause the at least one processor to perform a globally unique identifier partition table (GPT) recovery method comprising:

checking, during registering of a GPT, whether the GPT and a backup GPT located in a backup partition are complete, wherein the backup partition is located outside a user partition in a storage medium;

at a first time: recovering the GPT through the backup GPT located in the backup partition if the GPT is damaged and the backup GPT located in the backup partition is complete; and at a second time:

recovering the backup GPT located in the backup partition through the GPT if the GPT is complete and the backup GPT located in the backup partition is damaged, wherein recovering the backup GPT comprises:

obtaining, from a GPT-head structure in the GPT, a variable pointing to an address of the backup partition;

obtaining the address of the backup partition based on the variable pointing to the address of the backup partition; and rewriting the backup GPT to the backup partition based on the address of the backup partition.

10. The computer readable medium according to claim 9, wherein the backup partition is located in a reserved space between user partitions of the storage medium or in a system partition.

11. The computer readable medium according to claim 9, wherein a variable pointing to an address of the backup partition is stored in an address space in the storage medium; and checking whether a backup GPT is complete comprises:

obtaining, from the address space, the variable pointing to the address of the backup partition; checking whether the variable pointing to the address of the backup partition is complete;

obtaining address information of the backup partition through the variable pointing to the address of the backup partition if the variable pointing to the address of the backup partition is complete;

obtaining the backup GPT from the backup partition based on the address information of the backup partition; and checking whether the backup GPT obtained from the backup partition is complete.

12. The computer readable medium according to claim 11, wherein a tail of the variable pointing to the address of the backup partition further comprises a check variable, the check variable being configured for verifying integrity of the variable pointing to the address of the backup partition; and checking whether the variable pointing to the address of the backup partition is complete comprises:

calculating a corresponding check value through a preset check function based on the variable pointing to the address of the backup partition, wherein if the calculated check value is consistent with a value of the check variable, it indicates that the variable pointing to the address of the backup partition is complete; and wherein if the calculated check value is inconsistent with the value of the check variable, it indicates that the variable pointing to the address of the backup partition is damaged.

13. The computer readable medium according to claim 12, wherein a head of the variable pointing to the address of the backup partition further comprises a magic variable, the magic variable being configured for causing a value of the check variable to be not zero; and calculating a corresponding check value through a preset check function based on the variable pointing to the address of the backup partition comprises:

calculating the corresponding check value through the preset check function based on the variable pointing to the address of the backup partition and the magic variable.

14. The computer readable medium according to claim 9, wherein the user partition in the storage medium for storing the backup GPT by default is last 34 storage blocks of the storage medium.

15. The computer readable medium according to claim 9, wherein the method further comprises, at a third time:

if the GPT and the backup GPT located in the backup partition are both damaged:

attempting to obtain the backup GPT from the user partition in the storage medium for storing the backup GPT by default; and recovering, when the backup GPT is successfully obtained from the user partition in the storage medium for storing the backup GPT by default, the GPT and the backup GPT located in the backup partition through the backup GPT obtained from the user partition in the storage medium for storing the backup GPT by default.

16. The computer readable medium according to claim 15, wherein the user partition in the storage medium for storing the backup GPT by default is last 34 storage blocks of the storage medium.

* * * * *